United States Patent Office 3,290,375
Patented Dec. 6, 1966

3,290,375
NAPHTHAMIDINES AND SALTS THEREOF
Morton Harfenist and Richard Baltzly, Scarsdale, N.Y., assignors to Burroughs Wellcome & Co. (U.S.A.) Inc., Tuckahoe, N.Y., a corporation of New York
No Drawing. Filed Mar. 19, 1964, Ser. No. 353,228
Claims priority, application Great Britain, Mar. 22, 1963, 11,554/63
13 Claims. (Cl. 260—564)

This invention relates to amidines and a method for preparing them.

In U.S. Patent 2,491,473 are described a number of 4-alkoxy-α-naphthamidines of Formula I

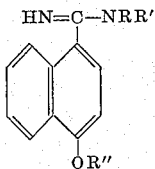

Formula I wherein R and R' are alkyl groups containing together from 4 to 10 carbon atoms and R" is an alkyl group of one to four carbon atoms. These substances were of interest because of their activity as local anaesthetics, maximal activity being observed when R=R'=butyl and R"=methyl or ethyl. The local anaesthetic activity tended to diminish as the alkyl groups were made larger.

It has now been found that compounds of this general type in which larger alkyl groups are present possess valuable activity against tapeworm infestations of man and animals. The compound of Formula I in which R=R'=R" being quite active in the test organism *Hymenolepis nana* (in the mouse). Further investigation has shown that this activity extends and becomes even more notable with compounds having still larger alkyl groups and, at the same time, the toxicity diminishes.

Tapeworm infestations are of varied importance to human and veterinary medicine in different parts of the world. Parasites of interest are *Hymenolepis nana* or *H. diminuta* in man, *Echinococcus granulosus* in dogs, *Diphyllobothrium latium* in man, *D. mansoni* or *D. erinacci* in dogs, cats or pigs, *Moniezia expansa* in sheep or cattle, *Davainea proglottina* in poultry, *Raillietina tetragona, R. echinobothrida* in poultry, *Taenia taeniaformis* in cats, *T. hydatigena* or *T. pisiformis* in dogs or *T. solium* in man. Of especial concern is *Echinococcus granulosis* which constitutes a major public health problem in some regions and is also the cause of considerable economic loss. The definitive host of this parasite is an animal of the dog family, especially the domestic dog. In these the worm itself is innocuous. Its cysts, however, infect live-stock animals such as sheep, cattle, horses, reindeer and occasionally man, and in these intermediate hosts much damage is produced. Since the cysts are rarely accessible to treatment, the parasites must be attacked at the vulnerable part of their life-cycle—in the dog.

Primary screen parasites in this study are the tapeworms *Hymenolepis nana* (studied in the mouse) and *Oöchoristica symmetrica* (also in the mouse). The first of these organisms is rather easily eliminated whereas the latter is highly resistant. Compounds showing activity against these parasites are then tried against tapeworms of dogs and cats (which are of some practical significance) and later against other parasites including *Echinococcus*.

While the activity of these amidines varies somewhat from parasite to parasite, optimal activity in a general sense is shown by compounds of Formula II

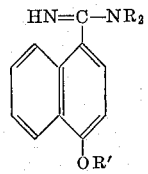

Formula II wherein R and R' are alkyl groups such that the sum of the carbon atoms of the Rs and R' is a number from 14 to 19 inclusive. The choice of these limits is not dictated solely by activity but also by toxicity.

All of these compounds are relatively toxic if injected into the body and the relative harmlessness of the higher members when given orally is presumably due to poor absorption from the intestinal tracts of the higher animals. The following table shows the toxicity ($LD_{50}$) in mice of typical compounds of the present invention compared with corresponding data on compounds having only slightly smaller alkyl groups.

TOXICITY OF AMIDINE HYDROCHLORIDES
Substitutions in Formula II

| Compound of Ex. | R | R' | $LD_{50}$ p.o., mg./kg. |
|---|---|---|---|
| 2 | Heptyl | Butyl | >1,000 |
| 3 | Heptyl | Amyl | >1,000 |
| 4 | Hexyl | Butyl | >1,000 |
| 7 | Octyl | Methyl | >1,500 |
| 8 | Hexyl | Amyl | >1,000 |
| 9 | Butyl | Hexyl | 550–600 |
|  | Hexyl | Methyl | 244 |
|  | Butyl | Butyl | 200 |
|  | Butyl | Amyl | 225 |
|  | Amyl | Ethyl | 160 |

Of course, these toxicities in mice are only a guide in continuations of the study with other hosts. However, the amidine of Example 9 has been given to dogs at 200 mg./kg. orally. Not only did none of the animals die, but no toxic symptoms were observed. (The animals were, incidentally, cleared of *Echinococcus granulosis*.) The same compound eliminates the common dog tapeworms *Dipylidium caninum* and *Taenia pisiformis* at doses of 15–25 mg./kg. It has, therefore, a wide margin of safety.

The anthelmintic activity of the amidine acid addition salts lies in the amidine part of the molecule, and the acid may be any acid which reacts with the amidine base to give a therapeutically acceptable acid addition salt; for example embonate, hydrochloride, hydrobromide, lactate, citrate, sulphate, succinate, oxalate, p-toluenesulphonate, 2-hydroxy-3-naphthoate or p-chlorobenzene sulphonate acid addition salts.

While the amidines can in certain cases be isolated as the base, they are fairly strong bases having a pKa in the range 11–12 and hence will be positively charged (that is present as cation components of salts) under any conditions of physiological interest. If administered as bases, it would be expected that the acid gastric secretions would convert them to salts. Since, furthermore, the salts are very stable while the free bases are much less so, they will in practice be handled, stored and administered as acid addition salts.

An amidine of the invention may be prepared by a method similar to the methods described in the complete specification of U.K. Patent No. 619,659, namely, by the reaction of a halomagnesium dialkylamine of the formula $P_2N$ MgX (X being a halogen atom) with the appropriate 4-alkoxy-α-naphthonitrile and hydrolyzing the product.

The initial product of the reaction mixture is the halomagnesium derivative of the amidine. This is hydrolyzed, for example by an iced aqueous solution of ammonium chloride, and the halomagnesium radical is replaced by hydrogen so liberating the required amidine. Usually the hydrolysis product is contaminated with secondary amine which is removed by distillation in vacuo or by other conventional means (such as crystallization of the salts).

The halomagnesium radical is formed from a Grignard reagent and the appropriate secondary amine. Any Grignard reagent may be used as the Grignard hydrocarbon radical is eliminated as an inert hydrocarbon in the formation of the halomagnesium secondary amine. The halogen may be chlorine, bromine or iodine, but bromine is preferred and ethylmagnesium bromide has been found to be the most convenient reagent.

These amidines may also be prepared, but in rather inferior yield, by the method of British Patent 598,453.

This invention, therefore, provides a method for the preparation of an amidine or its acid addition salt as hereinbefore defined, comprising the reaction of a nitrile of the formula

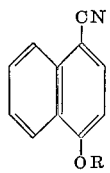

with a halomagnesium derivative of a secondary amine of the formula

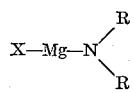

wherein X is a halogen atom, and subsequently hydrolyzing the product of this reaction.

In practice, an amidine may be presented for the treatment of a tapeworm infection in the form of an orally ingestible pharmaceutical composition comprising an amidine or a salt thereof with a therapeutically acceptable carrier therefor. An amidine in the form produced in its chemical synthesis and its solutions and suspensions in the liquids used therein is not as such a pharmaceutical composition as provided herein. The amidine may advantageously be presented in discrete units, such as tablets, capsules or cachets each containing a predetermined amount of the compound. It may also be presented as a powder or granules, as a solution or suspension in a non-aqueous or emulsified liquid.

The composition may be made by any of the methods of pharmacy, and may include one or more of the following accessory ingredients: diluents, solutes, buffers, flavoring, binding, dispersing, surface-active, thickening, lubricating, and coating materials, preservatives, antioxidants and bacteriostats, and any other acceptable excipients.

The preferred compositions for the treatment of an infection of a tapeworm are tablets and granules.

The following examples illustrate the invention. Temperatures are in degrees Celsius.

EXAMPLE 1

*Preparation of N,N-diamyl-4-hexyloxy-α-naphthamidine*

A Grignard solution was prepared from magnesium turnings (5 g.), ethyl bromide (22 g., 0.2 mole) in absolute ether (200 ml.) contained in a flask equipped with a stirrer, reflux condenser and a dropping funnel. Di-n-amylamine (32 g.) was added to this mixture at a rate sufficient to cause gentle refluxing and after the addition was complete, the solution was refluxed for a further hour. To the refluxed solution was added an ethereal solution of 4-hexyl-oxy-α-naphthonitrile (38 g., 0.15 mole) over a period of 30 minutes. After the addition was complete, the reaction mixture was refluxed for 24 hours, cooled and hydrolyzed with an iced hydrochloric acid solution. A considerable amount of solid separated and was filtered off. The filtrate was extracted with ether, the extract discarded, the aqueous layer was treated with a base and extracted with ether. The ethereal extract formed Extract I.

The solid orginally obtained by filtration was dissolved in warm water, the solution then basified and extracted with benzene to form Extract II. Extracts I and II were then evaporated separately on a steam bath, using, if necessary, a vacuum to remove final traces of di-amylamine. The two basic residues were then dissolved in absolute ethanol and acidified with ethanolic hydrogen chloride. Absolute ether was added until the solutions were barely turbid after which crystallization of the amidine hydrochloride was induced by scratching. The resulting salt melted at 217–218°.

EXAMPLE 2

*N,N-diheptyl-4-butoxy-α-naphthamidine hydrochloride*

To a solution of ethyl magnesium bromide (prepared from magnesium turnings (3.7 g.) and ethyl bromide (16.3 g.) in anhydrous ether (200 ml.)) was added di-n-heptylamine (32 g.) in dry ether (150 ml.). The solution was then refluxed for an hour and 4-butoxy-α-naphthonitrile (14.3 g.) dissolved in dry ether (250 ml.) was added gradually over one-half hour. The reaction-mixture was then stirred and refluxed for 18 hours, cooled and hydrolyzed with iced saturated ammonium chloride solution. The ethereal layer was separated, washed with water and dried over anhydrous potassium carbonate. This ethereal solution of the base was then evaporated and the residue was subjected to distillation at 0.03 to 0.05 mm. pressure. A portion of diheptylamine boiling at 85–93° was thus removed. The residue was dissolved in absolute ethanol, acidified with ethanolic hydrogen chloride and crystallized by addition of ether. The pure hydrochloride melted at 213–214°.

EXAMPLE 3

*N,N-diheptyl-4-pentoxy-α-naphthamidine hydrochloride*

This preparation was identical with that of Example 2 except that 4-pentoxy-α-naphthonitrile (22.4 g.) was added to the solution of bromomagnesium diheptylamide, and the reflux time was 19 hours. The amidine hydrochloride, purified as described in Example 2, melted at 207°.

EXAMPLE 4

*N,N-dihexyl-4-butoxy-α-naphthamidine hydrochloride*

To a solution of ethyl magnesium bromide (prepared as in Example 2) was added dihexylamine (17.6 g.) anhydrous ether (150 ml.). After 45 minutes refluxing, a solution of 4-butoxy-α-naphthonitrile (14.3 g.) was then added and the reaction mixture was stirred and refluxed for 24 hours. After working up by the method of Example 2, the pure hydrochloride, M.P., 218–219° was isolated.

EXAMPLE 5

*N,N-dihexyl-4-hexyloxy-α-naphthamidine hydrochloride*

A Grignard solution was prepared from magnesium turnings (4.85 g.) and ethyl bromide (19.7 g.) in anhydrous ether (250 ml.). To it was added a solution of di-n-hexylamine (40 g.) in anhydrous ether (220 ml.) and the solution was refluxed for one-half hour. To this was added over a period of 10 minutes a solution of 4-hexyl-oxy-α-naphthonitrile (38 g.) in warm dry benzene (100 ml.). The reaction mixture was stirred and refluxed for 42 hours and then hydrolyzed with iced hydrochloric acid (containing 60 ml. of concentrated hydrochloric acid). A solid separated that appeared to contain the whole of the product together with some dihexylamine hydrochloride, the magnesium salts and any neutral impurities being in the filtrate and washings. The solid was shaken with sodium hydroxide solution and ether, and the ethereal solution of the bases was dried over potassium carbonate and subjected to distillation in high vacuum to remove dihexylamine. The residual amidine was converted to the hydrochloride which was recrystallized from alcohol-ether mixtures, and then from nitromethane, M.P., 201–202°.

EXAMPLE 6

*N,N-dihexyl-4-heptyloxy-α-naphthamidine hydrochloride*

This preparation was run by the same procedure as that of Example 5 except that 4-heptyloxy-α-naphthonitrile (40 g.) was used. The amidine hydrochloride, isolated by the same procedure, melted at 197–198°, after crystallization from nitromethane.

EXAMPLE 7

*N,N-dioctyl-4-methoxy-α-naphthamidine hydrochloride*

This compound was prepared by the method of Example 5 (using 27.5 g. of 4-methoxy-α-naphthonitrile). The amidine hydrochloride melted at 173°.

EXAMPLE 8

*N,N-dihexyl-4-pentoxy-α-naphthamidine hydrochloride*

The Grignard solution was prepared from magnesium (5.35 g.) ethyl bromide (21.8 g.). Dihexylamine (40.7 g.) and 5-pentoxy-α-naphthonitrile (44.8 g.) were added exactly as described in Example 5. The isolation of the amidine also followed the same procedure. The amidine hydrochloride melted at 213° after crystallization from nitromethane.

EXAMPLE 9

*N,N-dibutyl-4-hexyloxy-α-naphthamidine hydrochloride*

A Grignard reagent was prepared from 22 g. (0.2 M) of ethyl bromide, 5.35 g. (0.22 g.-atom) of magnesium turnings ("for Grignard") and 250 ml. of commercial anhydrous ether, under a nitrogen atmosphere. To this was added over about 10 seconds 31.3 g. (0.243 M) of dry, carbonate-free di-n-butylamine, washing this in with about 50 ml. of anhydrous ether. The resulting mixture was stirred and heated under reflux about one hour. A solution of 47.8 g. (0.189 M) of 4-n-hexyloxy-1-naphthonitrile in about 250 ml. of hot benzene (previously dried by treatment with calcium hydride of material dried by azeotropic distillation) was then added, and the reaction mixture was heated under reflux for 19 hours. Cautious addition of 120 ml. of 6 N aqueous hydrochloric acid after this time gave a white precipitate which was filtered off and combined with the ether-benzene upper layer of the filtrate. The resulting suspension was largely dissolved by addition of ethanol, treated with 120 ml. of 6 N aqueous sodium hydroxide, and extracted with ether. The ethereal solution was dried with magnesium sulfate and evaporated down, finally using a mechanical pump and steam heat to distil off dibutylamine. The residue was dissolved in a little ethanol and treated with a slight excess of a concentrated solution of hydrogen chloride in ethanol, then ethyl acetate and finally anhydrous ether to incipient turbidity. Two such crystallizations yielded 60 g. of white solid M.P. 214–214.8° C.

*Analysis.*—For $C_{25}H_{39}ClN_2O$, M.W. 419.04: C, 71.63; H, 9.38. Found: C, 71.77; H, 9.00.

What we claim is:

1. An acid addition salt of a pharmaceutically acceptable acid with an amidine selected from the class consisting of N,N-di-n-butyl-4-hexyloxy-α-naphthamidine; N,N-dihexyl-4-butoxy - α - naphthamidine; N,N-diheptyl-4-butoxy-α-naphthamidine; N,N-di-octyl-4-methoxy-α-naphthamidine; N,N-dihexyl-4-pentoxy-α-naphthamidine and N,N-diheptyl-4-pentoxy-α-naphthamidine.

2. An acid addition salt of a pharmaceutically acceptable acid with N,N-di-n-butyl-4-hexyloxy-α-naphthamidine.

3. N,N-di-n-butyl-4-hexyloxy-α-naphthamidine hydrochloride.

4. An acid addition salt of a pharmaceutically acceptable acid with N,N-dihexyl-4-butoxy-α-naphthamidine.

5. N,N-dihexyl-4-butoxy-α-naphthamidine hydrochloride.

6. An acid addition salt of a pharmaceutically acceptable acid with N,N-diheptyl-4-butoxy-α-naphthamidine.

7. N,N-diheptyl-4-butoxy-α-naphthamidine hydrochloride.

8. An acid addition salt of a pharmaceutically acceptable acid with N,N-di-octyl-4-methoxy-α-naphthamidine.

9. N,N-di-octyl-4-methoxy-α-naphthamidine hydrochloride.

10. An acid addition salt of a pharmaceutically acceptable acid with N,N-dihexyl-4-pentoxy-α-naphthamidine.

11. N,N-dihexyl-4-pentoxy - α - naphthamidine hydrochloride.

12. An acid addition salt of a pharmaceutically acceptable acid with N,N-diheptyl-4-pentoxy-α-naphthamidine.

13. N,N-diheptyl-4-pentoxy - α - naphthamidine hydrochloride.

References Cited by the Examiner

UNITED STATES PATENTS 2,491,473  12/1949  Baltzly et al. _____ 260—564

OTHER REFERENCES

Lorz et al.: "Journal American Chemical Society," QD1A5 vol. 73, pages 93–5, 1951.

CHARLES B. PARKER, *Primary Examiner.*

ROBERT V. HINES, *Assistant Examiner.*